United States Patent [19]
Sekiya

[11] Patent Number: 5,862,402
[45] Date of Patent: Jan. 19, 1999

[54] SYSTEM FOR RAPIDLY ISSUING IC CARDS BY PROVING AN ASSOCIATION BETWEEN STORED ISSUE DATA AND DISCRIMINATION DATA THEN ISSUING IC CARDS PURSUANT TO THE ISSUE DATA

[75] Inventor: Satoshi Sekiya, Yokohama, Japan

[73] Assignee: Kabushiki Kaisha Toshiba, Kawasaki, Japan

[21] Appl. No.: 619,321

[22] Filed: Mar. 21, 1996

[30] Foreign Application Priority Data

Mar. 22, 1995 [JP] Japan ................................... 7-063060

[51] Int. Cl.$^6$ .................................................. G06F 13/00
[52] U.S. Cl. ........................................... 395/822; 711/115
[58] Field of Search ............................... 40/564; 235/379, 235/380, 448; 364/400, 706; 380/24; 400/63; 707/3; 395/822; 711/115

[56] References Cited

U.S. PATENT DOCUMENTS

| | | | |
|---|---|---|---|
| 4,186,871 | 2/1980 | Anderson et al. | 380/24 |
| 4,317,183 | 2/1982 | Shimizu et al. | 364/706 |
| 4,367,604 | 1/1983 | Porter, II et al. | 40/564 |
| 4,485,454 | 11/1984 | Kimoto | 707/3 |
| 4,855,578 | 8/1989 | Hirokawa et al. | 235/380 |
| 4,872,112 | 10/1989 | Hungerford | 364/400 |
| 4,947,027 | 8/1990 | Golightly | 235/448 |
| 4,947,370 | 8/1990 | Sugitani | 400/63 |
| 5,010,237 | 4/1991 | Kawana | 235/379 |
| 5,293,029 | 3/1994 | Iijima | 235/380 |

FOREIGN PATENT DOCUMENTS 0 430 257   6/1991   European Pat. Off. .

OTHER PUBLICATIONS

Patent Abstracts of Japan, vol. 15, No. 270 (P–1225), Jul. 1991, re JP–A–03–091042.

Patent Abstracts of Japan, vol. 12, No. 339, (P–757), Sep. 1988, re JP–A–63–098766.

*Primary Examiner*—Thomas C. Lee
*Assistant Examiner*—David Ton
*Attorney, Agent, or Firm*—Pillsbury Madison & Sutro LLP

[57] ABSTRACT

A medium issuing method comprises storing the issue data items corresponding to mediums each of which has a memory area, specifying one or more of the issue data items, reading the specified issue data items from the stored data step, and writing the read issue data items into the memory areas of the mediums.

14 Claims, 7 Drawing Sheets

```
*** ISSUING MACHINE'S MENU ***

1. CREATING ISSUE DATA
     2. DISPLAYING ISSUE DATA
     3. ISSUING A CARD
     4. END

ENTER THE DESIRED NUMBER ON THE MENU [ ]
```

```
*** ISSUING MACHINE'S MENU ***

1. CREATING ISSUE DATA
        2. DISPLAYING ISSUE DATA
        3. ISSUING A CARD
        4. END

ENTER THE DESIRED NUMBER ON THE MENU [ ]
```

FIG. 4

```
            *** SPECIFY ISSUE CARD ***
    0 0 0 0 0 1       0 0 0 0 1 1       0 0 0 0 2 1
    0 0 0 0 0 2       0 0 0 0 1 2       0 0 0 0 2 2
    0 0 0 0 0 3       0 0 0 0 1 3       0 0 0 0 2 3
    0 0 0 0 0 4       0 0 0 0 1 4       0 0 0 0 2 4
    0 0 0 0 0 5       0 0 0 0 1 5       0 0 0 0 2 5
    0 0 0 0 0 6       0 0 0 0 1 6       0 0 0 0 2 6
    0 0 0 0 0 7       0 0 0 0 1 7       0 0 0 0 2 7
    0 0 0 0 0 8       0 0 0 0 1 8       0 0 0 0 2 8
    0 0 0 0 0 9       0 0 0 0 1 9       0 0 0 0 2 9
    0 0 0 0 1 0       0 0 0 0 2 0       0 0 0 0 3 0

F1=DISPLAY NEXT PAGE  F2=DISPLAY PRECEDING PAGE
F3=SPECIFY ISSUING   ARROW KEY=MOVE CURSOR
```

FIG. 5

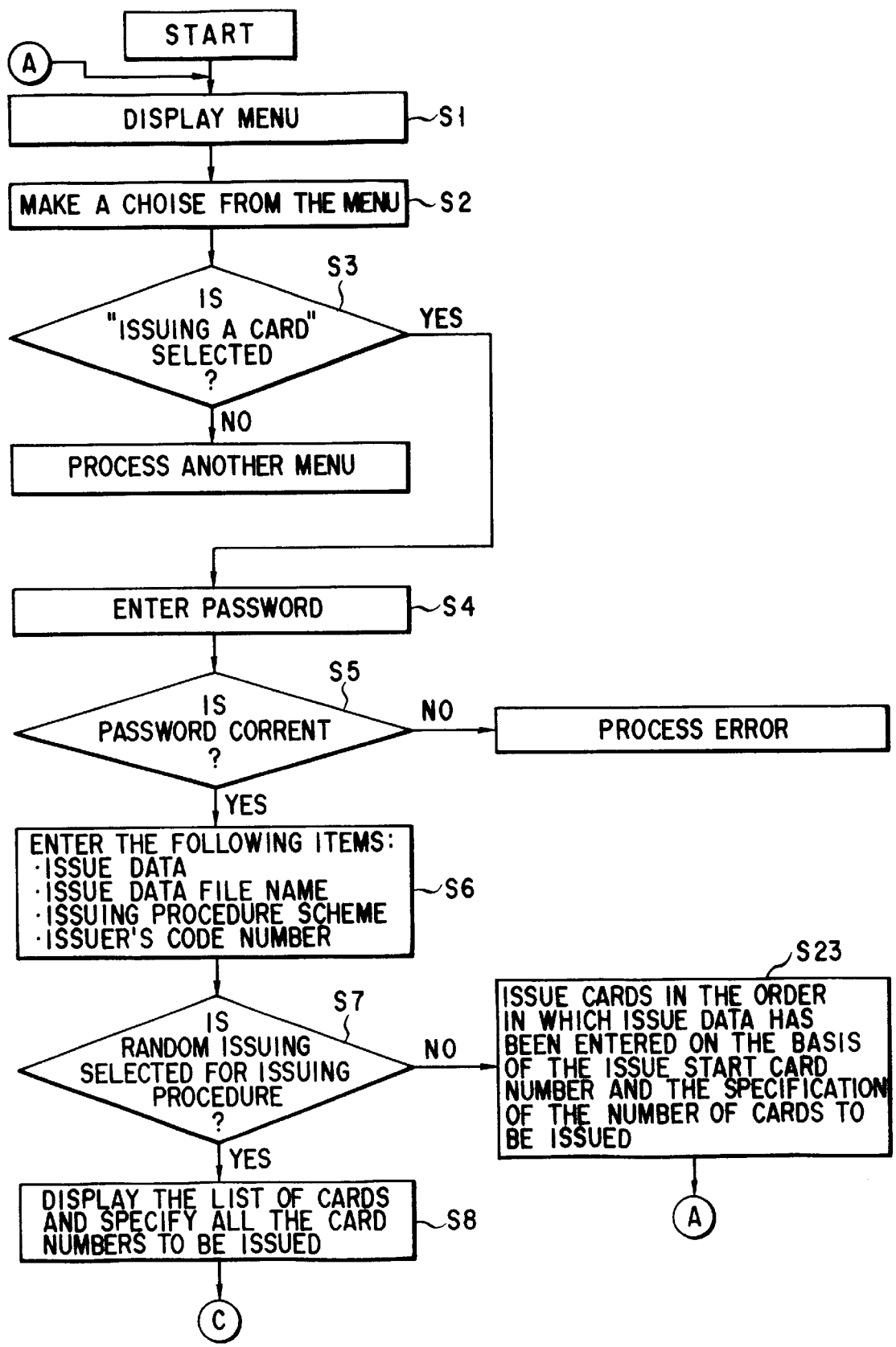
F I G. 6A

SYSTEM FOR RAPIDLY ISSUING IC CARDS BY PROVING AN ASSOCIATION BETWEEN STORED ISSUE DATA AND DISCRIMINATION DATA THEN ISSUING IC CARDS PURSUANT TO THE ISSUE DATA

BACKGROUND OF THE INVENTION

1. Field of the Invention

This invention relates to a method of and apparatus for issuing portable storage mediums containing memory, such as IC cards.

2. Description of the Related Art

Recently, IC cards containing an IC chip with a nonvolatile data memory and a CPU (central processing unit) to control the memory have been widely used in various industries as portable storage mediums.

IC cards of this type are usually issued at a card issuing company using an IC card issuing machine. A general card issuing procedure comprises writing the issue data onto the specified cards in the order of entry on the basis of the issue data for issuing cards previously entered in the issuing machine. Then the cards are issued in sequence.

With the IC card issuing machine, when the issue data is written into the data memory of an IC card (card issuing), the IC card is issued on the basis of the issue data to issue cards entered in the issuing machine. For example, to issue only part of a large number of registered cards, it is necessary to select the desired issue data items randomly from the large number of issue data items entered in the issuing machine and issue the IC cards. In the prior art, the desired issue data item has had to be separately retrieved for each IC card prior to issuance of each card. Accordingly, this lengthens the issuing time and renders the process much less efficient.

SUMMARY OF THE INVENTION

The object of the present invention is to provide a method of and apparatus for issuing a plurality of portable storage mediums randomly which reduce the issuing time and the work stages remarkably and achieve a high reliability.

The foregoing method is accomplished by providing a medium issuing method comprising: storing issue data items which are to be written into each of memory areas in each of mediums; displaying a list of the issue data items; specifying the issue data items corresponding to the mediums to be issued based on the displayed list; reading the specified issue data items from the stored data items; and writing the read issue data items into the memory areas of the mediums.

The foregoing method is also accomplished by providing a medium issuing apparatus comprising: means for storing issue data items which are to be written into each of memory areas in each of mediums; means for displaying a list of the issue data items; means for specifying the issue data items corresponding to the mediums to be issued based on the displayed list; means for reading the specified issue data items from the stored data items; and means for writing the read issue data items into the memory areas of the mediums.

As described above, with the present invention, when a plurality of mediums or IC cards are issued randomly, IC cards are specified at one time and an issuing apparatus issues the specified IC cards in sequence, instead of repeating the operations of specifying an IC card and issuing the card as in the prior art. Specifically, a certain number of IC cards to be issued are first specified in one operation by the operator, the issue data items corresponding to the specified IC cards stored in the IC issuing apparatus are read out sequentially, and the issued data items are written onto the cards one after another, thereby enabling IC cards to be randomly issued efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 illustrates a concrete example of a menu screen;

FIG. 5 illustrates a concrete example of a screen used to specify the cards numbers to be issued;

FIG. 6A and 6B are flowcharts to help explain the processing in a first embodiment of the present invention.

DETAILED DESCRIPTION OF THE PREFERRED EMBODIMENTS

Hereinafter, referring to the accompanying drawings, embodiments of the present invention will be explained.

Figures 1, 2, 3:
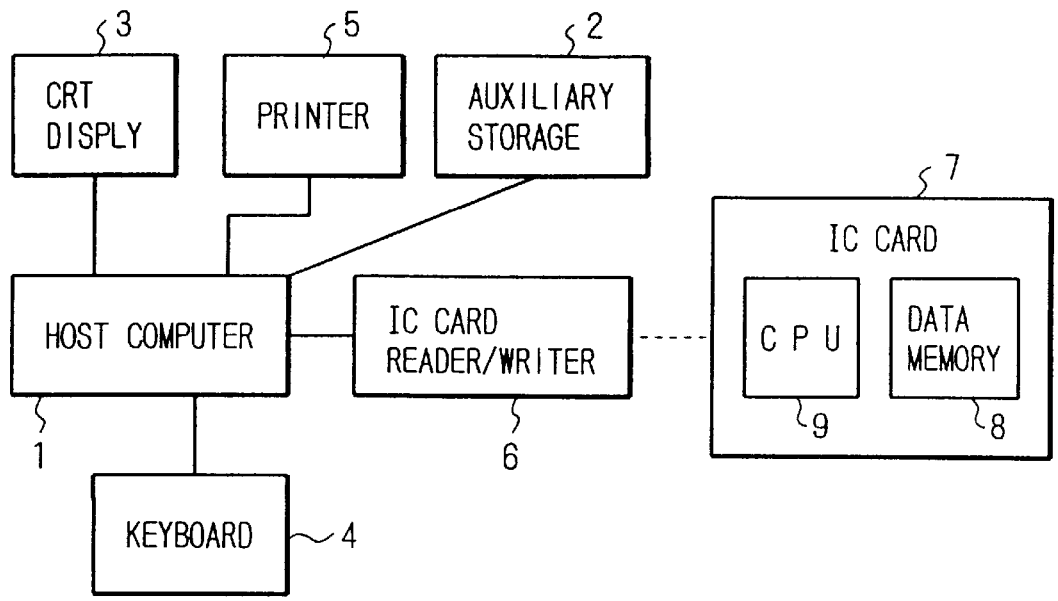
FIG. 1 is a block diagram of the entire configuration of an IC card issuing apparatus according to an embodiment of the present invention.
FIG. 2 shows a format of an issue data file.
FIG. 3 shows a format of an issue number cataloged file.

FIG. 1 shows the configuration of an IC card issuing apparatus as an example of a portable storage medium issuing apparatus according to the present invention. In FIG. 1, connected to a host computer 1 supervising the entire control are an auxiliary storage unit 2 serving as storage means that stores a control program controlling the entire apparatus, information on the card issuer, or an issue data file containing the issue data items such as pieces of information on the individual card owners, a CRT display unit 3 serving as display means for displaying the operation procedure of the present apparatus and the operating states, a keyboard 4 used to enter data or operating instructions, and a printer unit 5 for printing issuing records.

In addition, an IC card reader/writer 6 is connected to the host computer 1. The IC card reader/writer 6, in which an IC card (portable storage medium) 7 to be issued is inserted, writes the issue data into the memory of the IC card 7 or reads specific data items from the memory of the IC card 7 as the needs arises. The IC card 7 contains a data memory 8 composed of a nonvolatile memory, such as an EEPROM, and an IC chip having a CPU 9 controlling these components.

The issue data file stored in the auxiliary storage unit 2 has a format as shown in FIG. 2. Specifically, the issue data file has a structure where identification information, such as a 6-digit card number 21, is placed at the head, followed by a group of issue data items 22 to be written into the data memory of the IC card 7. In the example of FIG. 2, the individual issue data items 22 are termed data 1, data 2, . . . , data n.

Figure 6B:
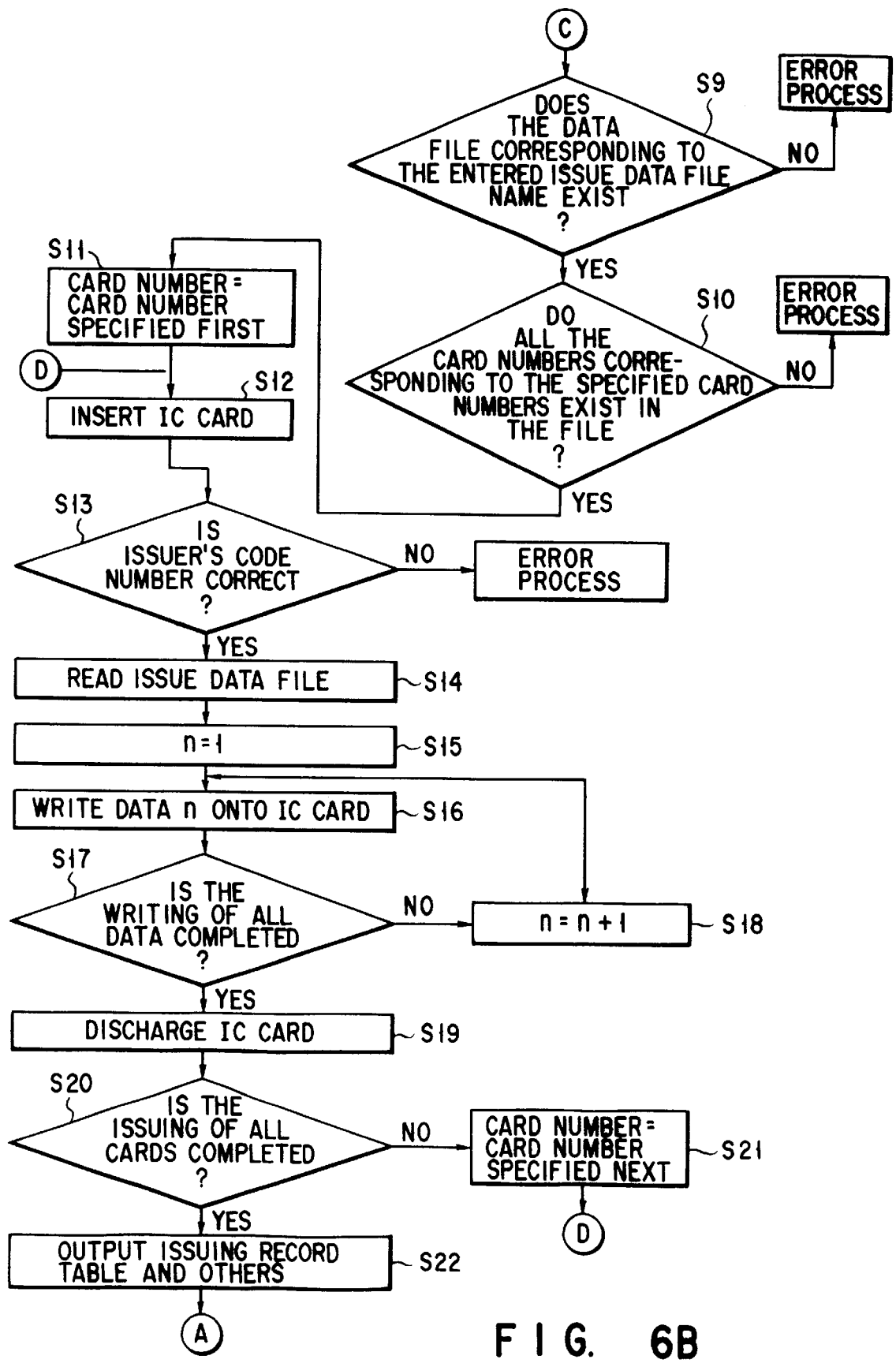

The processing of the first embodiment with the above configuration will be explained with reference to the flowcharts in FIGS. 6A and 6B.

When an IC card to be issued corresponds to any one of all the data items on IC cards stored in the memory, there is no problem. When only several IC cards are issued, there are two ways of specifying them. One way is a method of a first embodiment of the invention that specifies only the IC cards to be issued. The other way is a method of a second embodiment of the invention that specifies only the IC cards not be issued in the stored data items and issues the remaining IC cards in sequence.

Hereinafter, the method of the first embodiment will be described.

First, the present apparatus is initialized and then, for example, a menu screen as shown in FIG. 4 appears on a CRT display unit 3 (S1). Here, when the operator selects "3. ISSUING A CARD" on the menu represented on the CRT display unit 3 (S2, S3), control will enter a card issuing process.

After control has entered the card issuing process, the message to request the operator to enter his or her password will appear on the CRT display unit 3. When the operator enters the password from the keyboard 4 (S4), the host computer 1 will collate the entered password with a password previously stored in the auxiliary storage unit 2 (S5). When they coincide with each other, the file name of the issue data to be issued, the issuing procedure scheme (issuing mode), and the message to request the entry of the issuer's code number will appear on the CRT display unit 3. When the operator enters these pieces of information from the keyboard 4 (S6), the entered information will be stored in the memory section (not shown) of the host computer 1.

Next, at step S7, it is judged whether the scheme of issuing IC cards randomly (a first mode) has been selected for the issuing procedure. If the first mode has been selected, the host computer 1 will display on the CRT display unit 3 the message to request the operator to specify the issue card number. Furthermore, it will display a list of all the cards on the screen. When the operator specifies the card number of an IC card to be issued (or the card numbers of IC cards to be issued) (S8), the specified information will be stored in the auxiliary storage unit 2 in the form of an issue number cataloged file having a format as shown in FIG. 3.

In this case, the method of specifying the card numbers of IC cards to be issued is such that a screen as shown in FIG. 5 is allowed to appear on the CRT display unit 3 to show a list of all the card numbers 2 stored in the issue data file in the auxiliary storage unit 2, and the operator moves the cursor to the card number of an IC card to be issued and presses a specific key, thereby storing the card number in the issue number cataloged file in the auxiliary storage unit 2 and simultaneously highlighting the card number on the screen, whereby the selection can be identified readily.

In the example of FIG. 5, with 30 card numbers being displayed at a time on the screen, when the function key F1 is pressed, the next card number group will appear; when the function key F2 is pressed, the preceding card number group will appear; and when the function key F3 is pressed, the issuing of the IC card will be specified. The cursor is represented by an underline and moves in the direction in which the pressed arrow key points. On the screen of FIG. 5, card numbers 000003, 000007, and 000015 have been specified and the cursor is at card number 000023.

Next, the host computer 1 checks to see if the issue data file corresponding to the entered issue data file name exists in the auxiliary storage unit 2 (S9). If it exists, it will check at step S8 to see if all of the specified card numbers are present in the issue data file (S10). If they are present, the card number to be issued will be set at the first specified card number 000003 stored in the issue number cataloged file (S11) and the message to request the operator to insert an IC card 7 will be allowed to appear on the CRT display unit 3.

By the request, when the operator inserts an IC card 7 to be issued into the IC card reader/writer 6 (S12), the host computer 1 will send the entered issuer's code number to the CPU 9 of the IC card 7 via the IC card reader/writer 6. Then, the CPU 9 of the IC card 7 will collate the received issuer's code number from the host computer 1 with the issuer's code number previously stored in the data memory 8 (S13), and send back the collation result to the host computer 1 via the IC card reader/writer 6.

If the two code numbers coincide with each other, the host computer 1 will read the issue data file corresponding to the entered issue data file name stored in the auxiliary storage unit 2 and store it in the memory section of the host computer 1 (S14).

Next, the host computer 1 reads the issue data added with the issue card number, for example, data 1 shown in FIG. 2, from the issue data file, the issue card number being the card number coinciding with the first specified card number 000003 of the card numbers specified on the list screen at step S8 and stored in the issue number cataloged file. Then, the host computer sends the issue data to the CPU 9 of the IC card 7 via the IC card reader/writer 6 and causes the CPU 9 to write it into the data memory 8.

After having written "data 1" into the data memory 8, the host computer 1 checks to see if the writing of all the data items (data 1 to data n) has been completed. If it is not completed, the issue data item will be updated and the same writing process will be repeated until the writing has been completed (S15 to S18). When the writing of all the data items belonging to the card numbers has been completed, the host computer 1 will send a card discharge instruction to the IC card reader/writer 6, thereby discharging the IC card 7 (S19).

Next, the host computer 1 checks to see if the issue data has been written for all the card numbers stored in the issue number cataloged file (S20). If it has not been written for all the card numbers, the host computer will update the card number to be issued to the next card number stored in the issue number cataloged file (S21), return control to step S12, and continue the same processing. Then, the message to request the operator to insert the IC card 7 with the following card number 000007 appears on the CRT display unit 3. When the IC card 7 is inserted in the IC card reader/writer 6, the processes at steps S12 to S20 will be repeated as described above.

At step S20, after the issue data has been written onto all the issue cards, the host computer 1 operates the printer unit 5 to print the issue records including the issue date, the issue data file name, the card numbers of the data issued, and the number of issued cards (S22), and returns control to step S1, thereby causing the menu screen to appear on the CRT display unit 3.

If at step S7, the scheme of issuing IC cards in the order in which the issue data items (the second mode) have been entered has been selected for the issuing procedure, the host computer 1 will carry out the process of issuing IC cards in the order in which the issue data items have been entered (S23). The process of issuing IC cards in the order of entry is a known technique and it will be explained here briefly.

When the second mode has been selected, the host computer 1 displays the message to request the operator to specify the card number of the first card to be issued and the number of cards to be issued on the CRT display unit 3. When the operator specifies the card number of the first card to be issued and the number of IC cards to be issued from the keyboard 4, the host computer 1 will read as many issue data items as the specified number of cards to be issued from the issue data file, starting at the issue data item added with the card number coinciding with the above card number, in the order of entry and issues IC cards in the order of entry.

In each of the respective checking processes (S5, S9, S10, S13), if a check failure has taken place and an error has occurred, an error message will appear on the CRT display unit 3 and the process will be terminated or interrupted.

Figure 7A:
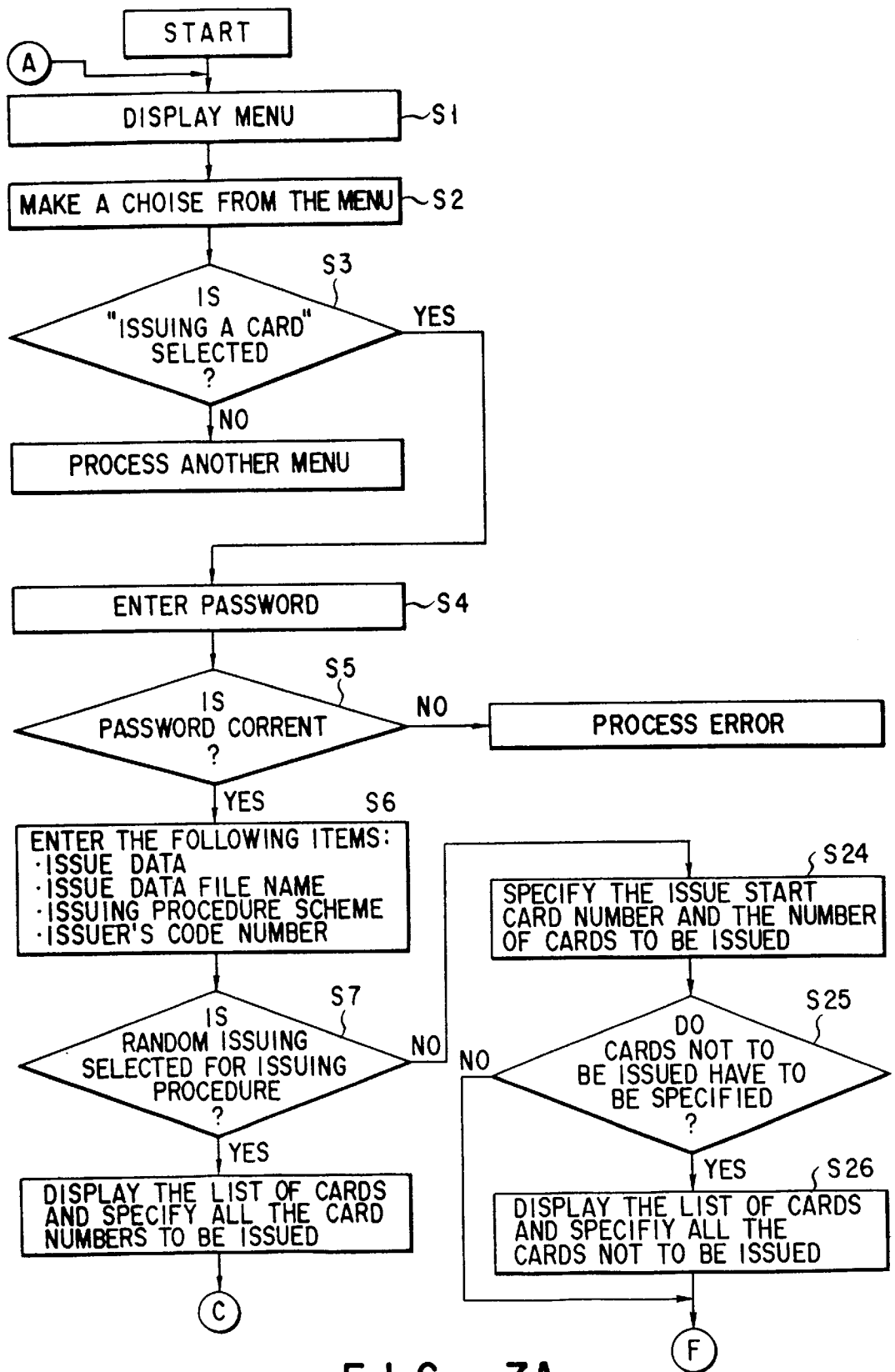
FIGS. 7A, 7B, and 7C are flowcharts to help explain the processing in a second embodiment of the present invention.
Figure 7B:
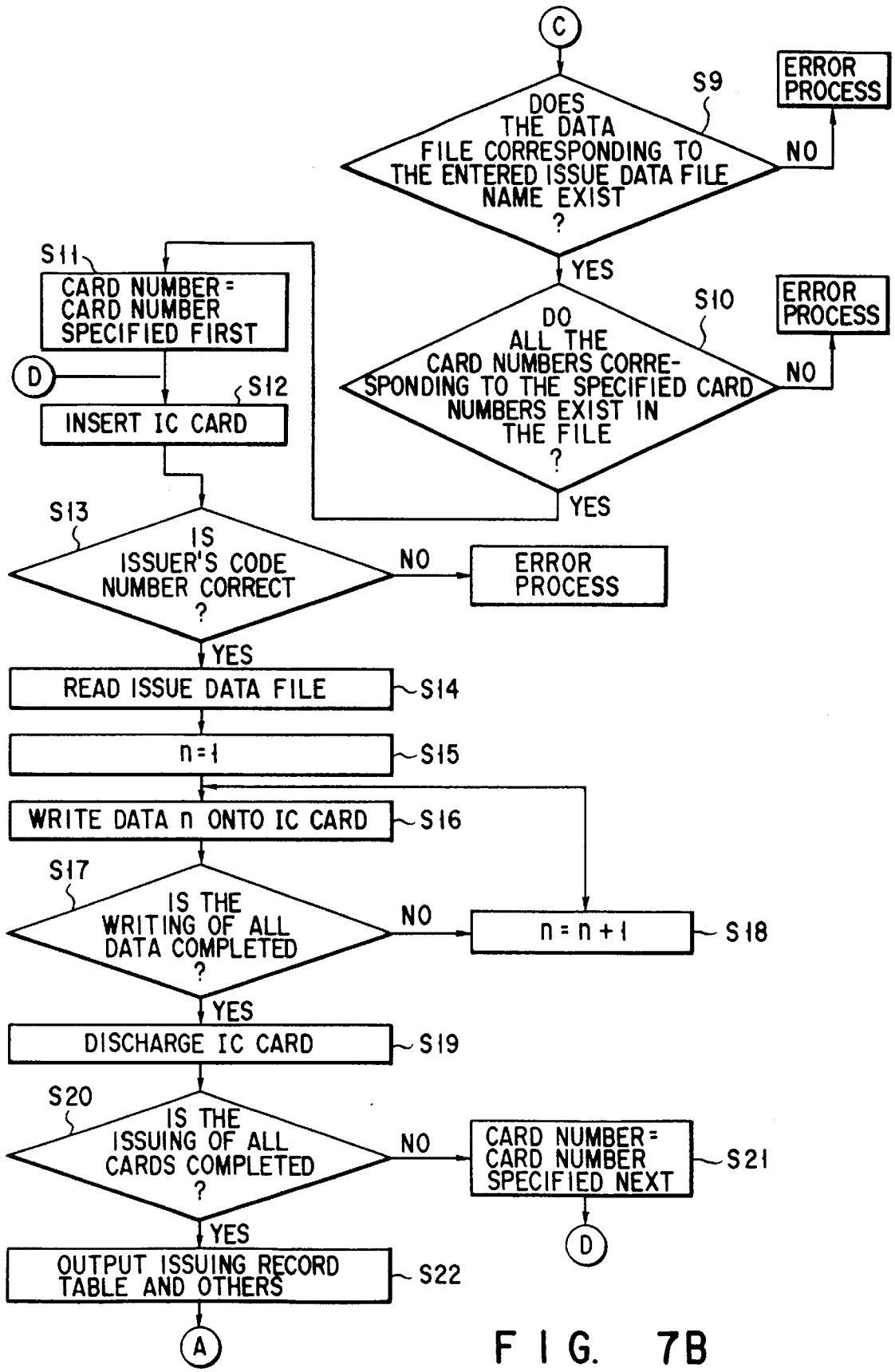
Figure 7C:
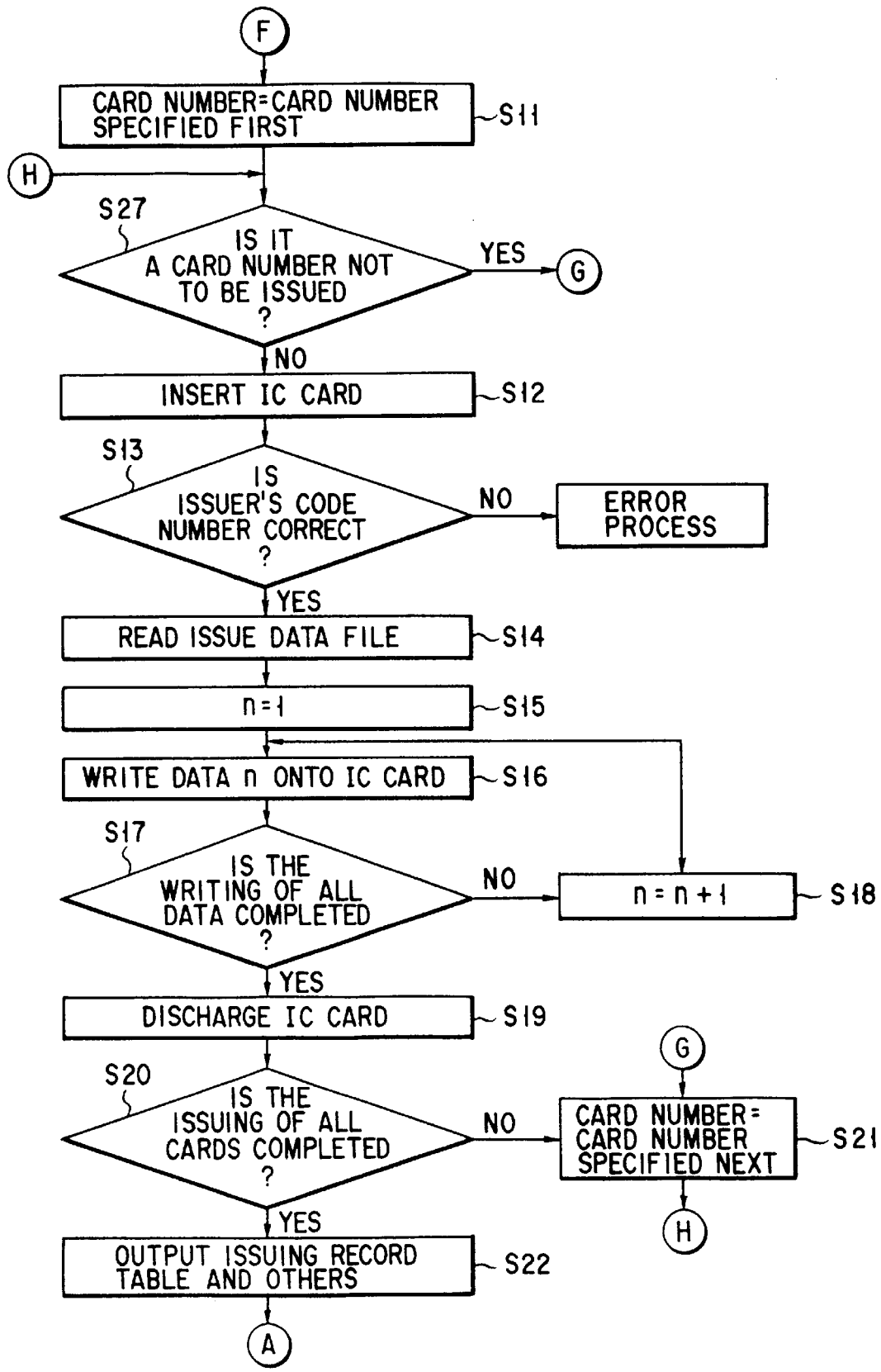

FIGS. 7A, 7B, and 7C are flowcharts to help explain a second embodiment of the present invention.

The second embodiment is related to a method of specifying the IC cards to be issued by specifying the data items on the IC cards not to be issued of the stored data items.

Explanation of the same parts as those in FIGS. 6A and 6B will be omitted and only the different parts will be explained in detail.

After the issue start card number and the number of cards to be issued have been specified at step S24, it is judged whether the cards not to be issued should be specified (S25). Specifically, a choice of unissued card specifying mode is added on the screen. If the choice is selected, the entry number of the card not to be issued selected by the operator will be stored (S26). Thereafter, the card number is set to the card number first specified at step S24 (S27). Then, it is judged whether the set number is equal to the number of the card not to be issued specified at step 26 (S27). If it is the number of the card not to be issued, control will go to step S21, where the next number will be set. If it is not the number of the card not to be issued, the issuing process will be carried out in the same manner as in the first embodiment.

The scheme of issuing IC cards in the order of entry (the second mode) is implemented according to the procedure shown in FIG. 7B, which is the same as in the first embodiment.

With the second embodiment, when all the cards except for, for example, several specific cards are to be issued, it is possible to simplify the operations, achieving a more efficient IC card issuing process.

As explained above, with the first and second embodiments, it is possible to specify only the issue data items on the IC cards to be actually issued (or only the issue data items on the IC cards not to be issued) of a large number of issue data items to issue IC cards entered in the issue data file and thereby automatically read these data items and write them into the memories of the IC cards consecutively. Furthermore, because the specifying operations can be done at a time before the card issuing is started, IC cards can be issued consecutively without intervention of the operator, once the card issuing has been started. As a result, it is possible to provide a highly reliable IC card issuing apparatus which reduces the issuing time remarkably, especially when a plurality of IC cards are issued randomly, and therefore improve the working efficiency.

As described above in detail, with the present invention, it is possible to provide a highly reliable method of and apparatus for issuing portable storage mediums which reduce the issuing time remarkably in issuing a plurality of portable storage mediums randomly, and therefore improve the working efficiency.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A medium issuing method for issuing mediums having memory areas and for writing issue data into the memory areas, comprising:

storing each issue data and corresponding discrimination data for a corresponding medium so that each issue data and the corresponding discrimination data are associated with each other;

reading the discriminating data and displaying the discriminating data in a list;

specifying a plurality of the discriminating data corresponding to the mediums to be issued from the issue data list;

checking whether the stored issue data items corresponding to the plurality of specified discriminating data have been stored and thereafter reading the issue data corresponding to the specified discrimination data from the stored issue data; and writing the read issue data into the memory area in the medium to be issued.

2. A medium issuing method according to claim 1, wherein the specifying step further comprises:

moving a cursor to one of the issue data items in the list, pressing a specific key on a keyboard to determine one or more of the issue data items, and performing inversive display of the determined issue data items.

3. A medium issuing method according to claim 1, wherein the specifying step further comprises:

specifying the issue data items other than the determined issue data items by determining one or more not to be specified of the issue data items.

4. A medium issuing method according to claim 3, wherein the specifying step further comprises:

moving a cursor to one of the issue data items in the list, pressing a specific key on a keyboard to determine the specific issue data items, and performing inversive display of the determined issue data items.

5. A medium issuing method according to claim 1, wherein the specifying step further comprises:

specifying the issue data items by entering an issue start one of the issue data items and the number of mediums to be issued.

6. A medium issuing apparatus for issuing mediums having memory areas and writing issue data into the memory areas, comprising:

means for storing each issue data and corresponding discrimination data for a corresponding medium so that each issue data and the corresponding discrimination data are associated with each other;

means for reading the discriminating data and displaying the discriminating data one after another in a list;

means for specifying a plurality of discrimination data corresponding to the mediums to be issued from the issue data list one after another;

means for checking to determine whether the issue data items specified at the specifying means are present in the storing means;

means for reading the issue data corresponding to the discrimination data specified by the specifying means from the stored issue data one after another after checking, according to said means for checking; and means for writing the read issue data into the memory areas in the mediums to be issued one after another.

7. A medium issuing apparatus according to claim 6, wherein the specifying means further comprises:

means for moving a cursor to one of the issue data items in the list, for pressing a specific key on a keyboard to determine one or more of the issue data items, and for performing inversive display of the determined issue data items.

8. A medium issuing apparatus according to claim 6, wherein the specifying means further comprises:

means for specifying the issue data items other than the determined issue data items by determining one or more not to be specified of the issue data items.

9. A medium issuing apparatus according to claim 8, wherein the specifying means further comprises:

means for moving a cursor to one of the issue data items in the list, for pressing a specific key on a keyboard to determine the specific issue data items, and for performing inversive display of the determined issue data items.

10. A medium issuing apparatus according to claim 6, wherein the specifying step further comprises:

means for specifying the issue data items by entering an issue start one of the issue data items and the number of mediums to be issued.

11. A medium issuing apparatus for issuing mediums having memory areas and writing issue data into the memory areas, comprising:

means for storing each issue, data and corresponding discrimination data for a corresponding medium so that each issue data, and the corresponding discrimination data are associated with each other;

means for reading the discriminating data from the storing means and displaying the discriminating data in a list;

means for specifying a plurality of discriminating data corresponding to the mediums not to be issued;

means for reading one after another the issue data from the stored data corresponding to the discrimination data not specified by the specifying means, wherein said reading means comprises means for recognizing whether each of the issue data according to the discrimination data not specified by the specifying means exists in the storing means, and reading out each of the issue data according to the discrimination data not specified by the specifying means one after another when the recognizing means has recognized the existence of the issue data to be read; and means for writing the read issue data into the memory areas in the mediums.

12. A medium issuing apparatus according to claim 11, wherein the specifying step further comprises:

second specifying means for specifying the issue data items by entering an issue start one of the issue data items and the number of mediums to be issued.

13. A medium issuing apparatus according to claim 12, wherein the reading means further comprises:

means for reading any of the issue data items which were not specified by the first specified means and belong to an area specified by the second specifying means.

14. A medium issuing apparatus which issues portable mediums comprising memory areas and writes issue data into the memory areas, comprising:

means for storing each issue data and corresponding discrimination data for a corresponding portable medium so that each issue data and the corresponding discrimination data are associated with each other;

first means for specifying one of a first mode and a second mode, in the first mode the portable mediums being issued one after another, in the second mode the portable mediums being issued in an order of registration of the issue data;

displaying means for, when the first mode is selected, reading the discrimination data stored from the storing means and displaying the discriminating data one after another in a list;

second means for specifying one of the discrimination data corresponding to the portable mediums to be issued from the discrimination data displayed on the list one after another;

first means for reading each of the issue data according to the discrimination data specified by the second specifying means one after another;

third means for, when the second mode is selected, specifying one of the discrimination data and quantity of the portable mediums to be issued from the issue data stored in the storing means;

second means for reading out each of the issue data according to the medium to be issued as specified by the third specifying means to the specified quantity one after another; and writing means for writing the data read by the first reading means and the second reading means into the memories in the mediums to be issued one after another.

* * * * *